US006507199B1

United States Patent
Ahrndt et al.

(10) Patent No.: US 6,507,199 B1
(45) Date of Patent: Jan. 14, 2003

(54) METHOD FOR MEASURING THE OPERATING PROPERTIES OF A SUBSCRIBER LINE MODULE FOR HIGH-BIT-RATE DATA TRANSMISSION

(75) Inventors: Thomas Ahrndt, Munich (DE); Johann Neumayer, Dachau (DE)

(73) Assignee: Siemens Aktiengesellschaft, Munich (DE)

( * ) Notice: Subject to any disclaimer, the term of this patent is extended or adjusted under 35 U.S.C. 154(b) by 41 days.

(21) Appl. No.: 09/675,404

(22) Filed: Sep. 29, 2000

(30) Foreign Application Priority Data

Sep. 29, 1999 (DE) .......................................... 199 46 762

(51) Int. Cl.⁷ ............................................... G01R 31/11
(52) U.S. Cl. ...................... 324/533; 370/286; 324/534
(58) Field of Search .................................. 324/531–535, 324/527; 379/22, 27, 24–29, 93.08; 370/286

(56) References Cited

U.S. PATENT DOCUMENTS 5,187,585 A * 2/1993 Kaneda et al. ............... 358/227
5,565,740 A * 10/1996 Hiramatsu et al. ....... 315/209 R
6,215,855 B1 * 4/2001 Schneider .................... 379/22

* cited by examiner

Primary Examiner—N. Le
Assistant Examiner—Amy He
(74) Attorney, Agent, or Firm—Shaw Pittman LLP

(57) ABSTRACT

For measuring the operating properties of a subscriber line module (1) for high bit rate data transmission, a test signal is generated within the module and supplied into a test line (6) with a defined line termination (7) who line or terminating properties are known. The echo signal arising in the test line (6) as a result of the test signal is in turn detected in the subscriber line module (1) and interpreted for evaluating the operating properties.

20 Claims, 2 Drawing Sheets

METHOD FOR MEASURING THE OPERATING PROPERTIES OF A SUBSCRIBER LINE MODULE FOR HIGH-BIT-RATE DATA TRANSMISSION

BACKGROUND OF THE INVENTION

1. Field of the Invention

The present invention is directed to a method for measuring the operating properties of a subscriber line module for high-bit-rate data transmission and to a system for the implementation of this method.

2. Description of the Related Art

A simple and cost-efficient method for measuring such operating properties without using a separate test and with which the functionability of line cards can also be checked efficiently during ongoing operation was developed for currently employed modules or line cards that control the voice transmission between a public switching center and a standard telephone connection (POTS, plain old telephone service). In this method, a suitable test signal is introduced into a line with a signal processor and the voltages or, respectively, currents that result are detected. The measured data then allows conclusions to be drawn regarding the functionability of the line card.

Line cards of a more recent developmental stage that offer the possibility of high bit rate data transmission, however, will be more and more frequently employed in the immediate future. Such line cards are suited, for example, for ADSL (asymmetric bit rate digital subscriber line) or UDSL (universal digital subscriber line). ADSL represents a transmission method that offers the possibility of simultaneously transmitting the signals of a normal standard connection (POTS) or of an ISDN terminal (integrated services digital network) in the base band as well as, additionally, a high bit rate digital signal in a downstream direction to the subscriber terminal and a medium bit rate digital signal in an upstream direction (and potentially also in the downstream direction as well) in the frequency range lying thereabove over a single copper double lead.

The various frequency ranges are subdivided again into a plurality of sub-channels having a bandwidth of 4.3125 kHz. At the end of the common transmission path, the separation of the analog telephone signals from the digital signals then takes place with filter circuits (what are referred to as POTS or, respectively, ISDN splitters), and the signals are then supplied to the respective terminal device, for example, a telephone and a modem.

The fundamental structure of the frequency band for ADSL given echo compensation shown in FIG. 4 is very similar to the structure in FIG. 3. The further subdivision into sub-channels is already shown in FIG. 4. The base channel is again employed for the transmission of the signals of the standard telephone terminal (POTS). The next twenty-five sub-channels lying above this are again available for the transmission of digital signals in the upstream direction US. However, these twenty-five channels for this method can likewise be employed for the transmission of digital signals in the downstream direction together with the remaining sub-channels, so that a total of up to 249 sub-channels are available for the transmission in the downstream direction. This is possible since, due to the echo compensation, the echo of the signal output by the line card back to the line card is compensated, which nearly prevents a disturbing influence of this echo.

It is also desirable for this high bit rate data transmission method to be able to measure the properties of the subscriber line module during the production and during ongoing operation in a simple and fast way. The measuring methods developed for the currently employed POTS line cards, however cannot be applied given the new x DSL line cards.

One possibility of testing a subscriber line module for a high bit rate data transmission in production and in the field is to connect these in a testing manner to a second modem and then exchange data between this modem and the line card. This method offers the possibility of checking the properties of the subscriber line module in a very comprehensive and exhaustive way. For example, a complete measurement of the signal-to-noise ratio as well as a bit error measurement can thus be implemented. On the other hand, the method is very involved and requires a comparatively long time since, for example, for ADSL, a complete initialization phase taking approximately 10 seconds must first be run.

SUMMARY OF THE INVENTION

It is therefore an object of the present invention to specify a simple and fast method for measuring the operating properties of a subscriber line module for high bit rate data transmission, which requires no active test system at the subscriber side.

This object is achieved by a method in which, inventively, a subscriber line module initially generates a test signal that is supplied into a test line connected to the subscriber line module. The properties of the test line are known. An echo signal arising in the line due to the test signal is then in turn received in the subscriber line module or, respectively, the voltages and currents occurring in the line due to the test signal are measured and interpreted for evaluating the properties of the subscriber line module.

The method of the invention thereby utilizes a typical behavior pattern of a line. When, namely, the line is not correctly terminated at the opposite end, an echo arises as a result of the mismatch, which is dependent on the transmission signal and on the line characteristics, so that conclusions about the test signal and, thus, about the functionability of the subscriber line module can be drawn in the interpretation of the echo signal.

Since no initialization phase has to be run for the inventive method, and devices for receiving, interpreting and sending further test signals are not needed at the opposite end of the test line, the method can be implemented in a simple and fast manner. When, for example, a subscriber line module is to be checked in the field, then the test line can be briefly connected to the subscriber line module via a relay.

The object of the invention is also achieved with a system for measuring operating properties of a subscriber line module comprising a test line with known properties that is connectable to the subscriber line module; a signal generator for generating a test signal; a transmitter for feeding the test signal into the test line; a receiver for receiving a signal incoming from the test line or voltages and currents occurring in the test line due to the test signal; and an evaluator for acquiring and evaluating an echo signal or measured voltages and currents arising in the test line. The system may further comprise a relay at an output of the subscriber line module for a connection to the test line.

Developments of the invention include the method which also comprises the step of generating new frequency parts not contained in the test signal in the echo signal by employing a line termination having a non-linear characteristic at an end of the test line. The test signal may be a square-wave signal, a sine-wave signal, a voltage or current ramp, or a constant voltage or current. A plurality of these signals may be superimposed to form the test signal. In order to interpret the signal, time sampling may be utilized, and interpreting the signal may involve averaging, peak value detection, determining a running time of the echo signal, use of a correlation measurement, use of a threshold measurement, or the determination of a time duration until a steady state ensues. The method may further be implemented in a plurality of sections, the method further comprising the step of carrying out a check between the sections to determine whether a setup of a connection is to ensue from or to a subscriber terminal at an end of a telecommunications line connected to the subscriber line module, the method being suspended for a duration of the connection.

The inventive method may be utilized according to an xDSL method, further comprising the steps of generating the test signal in a frequency range in which the subscriber line module is in a position to send signals; and distorting the test signal such that the echo signal comprises frequency parts that can be received by the subscriber line module. A line termination having a non-linear characteristic may be utilized for distorting the test signal.

New subscriber line modules for high bit rate can usually only generate QAM (quadrature amplitude modulation) transmission signals with a defined frequency and amplitude, and—as in the case in FIG. 3 given grouped-frequency—may also determine the amplitude and the frequency only in a different frequency range from the received signals under certain circumstances. The difficulty can therefore arise in the function test that the reception part of the subscriber line module works either completely or at least partially in a different frequency range than the transmission part.

In order to nonetheless be able to make a reliable statement about the operating properties of the subscriber line module, the new frequency parts that were not contained in the original test signal are generated in the echo signal by employing a known line termination having a non-linear characteristic. The characteristic properties of these frequency parts can then, for example, be determined with methods for measuring non-linear distortions, so that a statement about the subscriber line module can also be made here.

In particular, it is then possible, for ADSL with grouped-frequency, to generate a test signal in the upper frequency band DS between 138 kHz and 1.1 MHz and to influence this with the non-linear termination such that the echo signal can in turn be received and interpreted in a simple way in the lower reception frequency band US of the subscriber line module. For example, a square-wave signal, a voltage ramp or a current ramp, a constant voltage or, respectively, a constant current or a sine signal can be employed as test signal. However, superimpositions of a plurality of test signals would also be conceivable.

The interpretation of the echo signal or, respectively, of the measured voltages and currents can take place in different ways. For example, a complete time sampling of the measured signals could be used; however, an averaging or peak value identification could also be used. Alternatively or additionally, the running time of the echo signal may also be identified with a correlation or threshold measurement. When a constant voltage or a constant current is supplied into the line as test signal, the duration up to the occurrence of a steady state can also be preferably acquired.

When the determination of the operating properties requires a plurality of measurements for a longer time, then the regular operation of the line card in the field should not be (or minimally) deteriorated as a result of this. Preferably, the measurements are therefore implemented in a plurality of sections (time slices), where a check is carried out between the time slices to see whether a connection setup should take place from or to a subscriber terminal at the end of a telecommunication line connected to the line card. When line test and connection setup cannot be implemented parallel with one another, then the measuring method is suspended for the duration of the connection.

According to the invention, a system for measuring the operating properties of a subscriber line module is proposed, in which the subscriber line module comprises a signal generator for generating the test signal, a transmitter for supplying the test signal into a test line connectable to the subscriber line module, the properties of the test line being known, a receiver for receiving a signal incoming from the line as well as an evaluator for acquiring and interpreting the echo signal arising in the line.

BRIEF DESCRIPTION OF THE DRAWINGS

The invention is explained in greater detail below with reference to the attached drawing.

DESCRIPTION OF THE PREFERRED EMBODIMENTS

Figure 1:
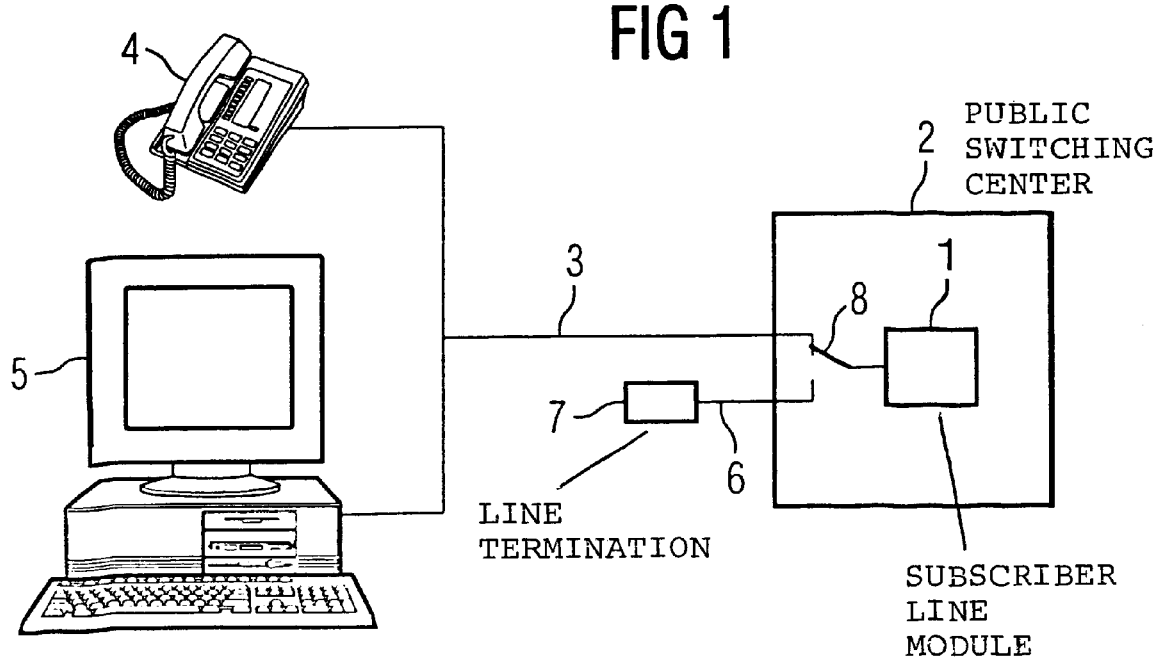
FIG. 1 is a schematic diagram illustrating the connection between the subscriber line module and a subscriber termination as well as a test line.

The telecommunication line 3 shown in FIG. 1 connects the subscriber-side terminal, which is composed of a telephone 4 and a modem 5—integrated, for example, in a PC—to the subscriber line module 1 arranged in the public switching center 2. A relay 8 is located at the output of the subscriber line module 1 with which the module can be connected for the duration of the measurement to a test line 6 whose line properties are known. A line termination 7 having non-linear properties is located at the end of the test line 6.

Figure 2:
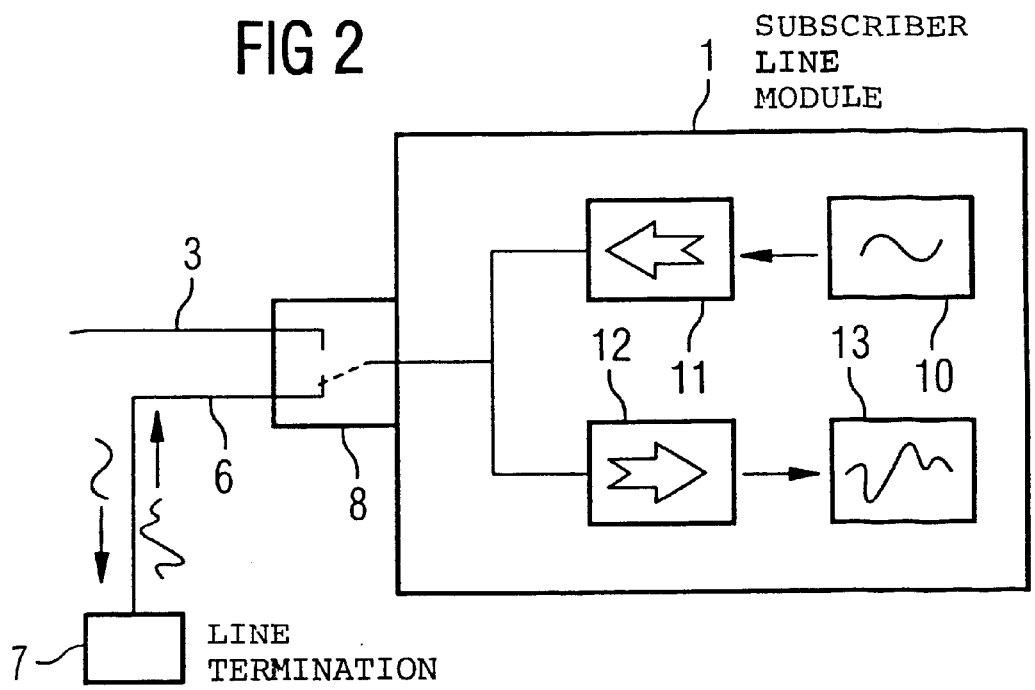
FIG. 2 is a schematic diagram showing a more detailed depiction of the subscriber line module.
Figure 3:
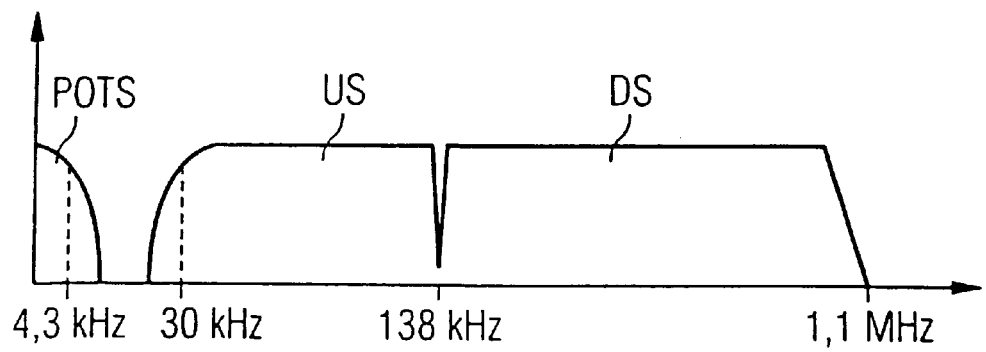
FIG. 3 is a frequency spectrum showing the fundamental structure of the frequency band for ADSL over POTS given grouped frequency.
Figure 4:
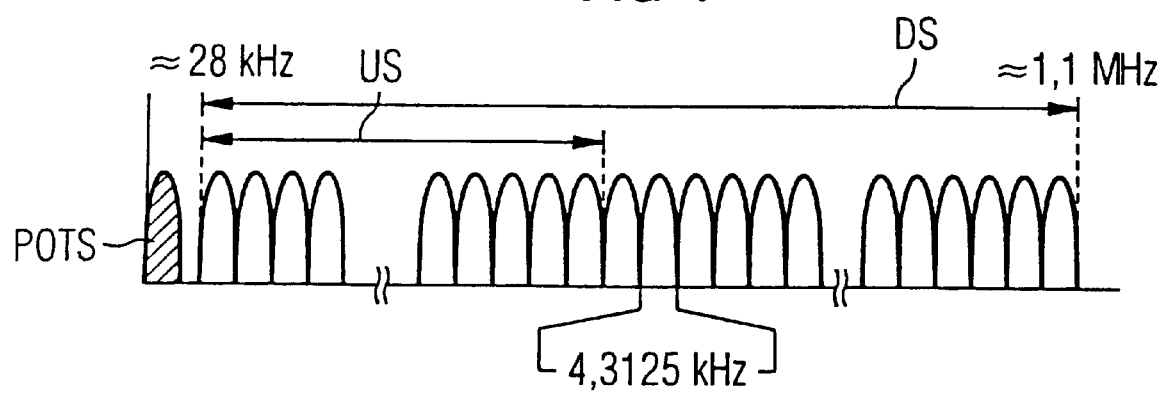
FIG. 4 is a frequency spectrum showing the fundamental structure of the frequency band for ADSL over POTS given echo compensation.

A more detailed structure of the subscriber line module 1 as well as the executive sequence of the inventive measuring method are shown in FIG. 2. The subscriber line module 1 comprises a signal generator 10 for generating a test signal. For example, a superimposition of two sine signals having frequencies of 200 kHz and 230 kHz could be employed as test signal. Such a test signal is supplied to the transmitter 11 of the subscriber line module 1 that supplies the test signal into the test line 6. The passive line termination 7 having a non-linear characteristic is located at the end of the test line 6. Due to the (desired) mismatch of the test line 6 as well as the non-linear properties of the line termination 7, an echo signal arises that exhibits new frequency parts compared to the original test signal. For the above example of the superimposition of two sine waves, a new frequency part in the region of 30 kHz would arise.

This echo signal returning to the subscriber line module 1 is received in the receiver 12 and is forwarded to an evaluator 13 that, for example, filters out and interprets the echo signal using a method for measuring non-linear distortions. Statements about the operating properties of the subscriber line module 1 can then be made on the basis of the structure of the echo signal.

Instead of sine signals, however, other signals shapes can also be employed as test signal. Furthermore, one may centrally arrange the signal generator 10 as well as the evaluator 13, which are not immediate component parts of the subscriber line module itself, in the public switching center 2. A data and signal exchange between the subscriber line module 1 and the two additional devices 11 and 13 as well as a connection of the test line 6 to the subscriber line module 1 may then occur only for the implementation of the testing method, so that all assemblies of a public switching center 2 can be checked in a simple and fast way with a central testing mechanism.

The above-described method and system are illustrative of the principles of the present invention. Numerous modifications and adaptations thereof will be readily apparent to those skilled in this art without departing from the spirit and scope of the present invention.

What is claimed is:

1. A method for measuring operating properties of a subscriber line module for high bit rate transmission, comprising the steps of:
   generating a test signal in said subscriber line module;
   feeding said test signal into a test line that is connected to said subscriber line module and whose line properties are known;
   generating an echo signal arising from said test signal with a defined line termination whose terminating properties are known;
   acquiring a signal to be interpreted selected from the group consisting of said echo signal, and measured voltages and currents, arising in said test line as a result of said test signal;
   interpreting said signal to be interpreted for evaluating said operating properties or said subscriber line module.

2. A method according to claim 1, further comprising the step of:
   generating new frequency parts not contained in said test signal in said echo signal by employing a line termination having a non-linear characteristic at an end of said test line.

3. A method according to claim 1, wherein said test signal is a square-wave signal.

4. A method according to claim 1, wherein said test signal is a sine-wave signal.

5. A method according to claim 1, wherein said test signal is a voltage or current ramp.

6. A method according to claim 1, wherein said test signal is a constant voltage or constant current.

7. A method according to claim 1, wherein said test signal is composed of a superimposition of a plurality of signals selected from the group consisting of a square-wave signal, a sine-wave signal, a voltage ramp, a current ramp, a constant voltage, and a constant current.

8. A method according to claim 1, further comprising the step of:
   time sampling said signal to be interpreted for said step of interpreting said signal to be interpreted.

9. A method according to claim 1, wherein said step of interpreting said signal to be interpreted utilizes averaging.

10. A method according to claim 1, wherein said step of interpreting said signal to be interpreted utilizes a peak value detection.

11. A method according to claim 1, wherein said step of interpreting said signal to be interpreted utilizes a determination of a running time of said echo signal.

12. A method according to claim 11, wherein said determination of said running time utilizes a correlation measurement.

13. A method according to claim 11, wherein said determination of said running time utilizes a threshold measurement.

14. A method according to claim 1, wherein said step of interpreting said signal to be interpreted utilizes a determination of a time duration until a steady state ensues.

15. A method according to claim 1, wherein said method is implemented in a plurality of section, said method further comprising the step of:
   carrying out a check between said sections to determine whether a setup of a connection is to ensue from or to a subscriber terminal at an end of a telecommunications line connected to said subscriber line module, said method being suspended for a duration of said connection.

16. The method according to claim 1, wherein said method is utilized according to an xDSL method, further comprising the steps of:
   generating said test signal in a frequency range in which said subscriber line module is in a position to send signals; and
   distorting said test signal such that said echo signal comprises frequency parts that can be received by said subscriber line module.

17. The method according to claim 16, further comprising the step of providing a line termination having a non-linear characteristic which is utilized for distorting said test signal.

18. A system for measuring operating properties of a subscriber line module comprising:
   a test line with known properties that is connectable to said subscriber line module;
   a signal generator for generating a test signal;
   a transmitter for feeding said test signal into said test line;
   a receiver for receiving a signal incoming from said test line or voltages and currents occurring in said test line due to said test signal; and
   an evaluator for acquiring and evaluating an echo signal or measured voltages and currents arising in the test line.

19. A system according to claim 18, further comprising a relay at an output of said subscriber line module for a connection to said test line.

20. A method for measuring operating properties of a subscribe line module for high bit rate transmission, comprising the steps of:
   transmitting a test signal into a test line that is connected at an output of said subscriber line module, wherein the test line properties are known;
   acquiring an echo signal in said subscriber line module arising from said test signal; and
   evaluating said echo signal to measure for non-linear distortions, wherein said echo signal is interpreted for evaluating said operating properties of said subscriber line module.

* * * * *